United States Patent
Minard (10) Patent No.: US 9,675,206 B2
(45) Date of Patent: Jun. 13, 2017

(54) MULTI-POSITION BEVERAGE DISPENSER

(71) Applicant: Carrier Corporation, Farmington, CT (US)

(72) Inventor: James J. Minard, Roscoe, IL (US)

(73) Assignee: CARRIER CORPORATION, Farmington, CT (US)

( * ) Notice: Subject to any disclaimer, the term of this patent is extended or adjusted under 35 U.S.C. 154(b) by 57 days.

(21) Appl. No.: 14/412,903

(22) PCT Filed: May 2, 2013

(86) PCT No.: PCT/US2013/039177
§ 371 (c)(1),
(2) Date: Jan. 5, 2015

(87) PCT Pub. No.: WO2014/007910
PCT Pub. Date: Jan. 9, 2014

(65) Prior Publication Data
US 2015/0190011 A1    Jul. 9, 2015

Related U.S. Application Data (60) Provisional application No. 61/668,706, filed on Jul. 6, 2012.

(51) Int. Cl.
*A47J 31/41*   (2006.01)
*A47J 31/46*   (2006.01)
(Continued)

(52) U.S. Cl.
CPC ........... *A47J 31/46* (2013.01); *A47J 31/4403* (2013.01); *B67D 1/0041* (2013.01); *G06F 3/0482* (2013.01); *G06F 3/04842* (2013.01)

(58) Field of Classification Search
CPC ..... A47J 31/46; A47J 31/4403; G06F 3/0482; G06F 3/04842; B67D 1/0041
(Continued)

(56) References Cited

U.S. PATENT DOCUMENTS 3,364,959 A * 1/1968 Hamilton ................. B67D 1/06
                                                        141/155
3,530,907 A * 9/1970 Slass ..................... B67D 1/124
                                                        141/167
(Continued)

FOREIGN PATENT DOCUMENTS

EP    0521531 A1    1/1993
EP    1672597 A2    6/2006
(Continued)

OTHER PUBLICATIONS

International Search Report for application PCT/US2013/039177, mailed Jul. 29, 2013, 5 pages.
(Continued)

*Primary Examiner* — Nicolas A Arnett
(74) *Attorney, Agent, or Firm* — Cantor Colburn LLP (57) ABSTRACT

Embodiments are directed to a control unit comprising an input/output interface to receive a selection of a product, a dispensing unit in communication with the control unit, the dispensing unit receiving commands from the control unit, the dispensing unit configured to generate a first portion of the product in a first position and generate a second portion of the product in a second position, and a shifting mechanism coupled to the dispensing unit, the shifting mechanism moving a product containing device from the first position to the second position when the first portion of the product is complete, wherein the dispensing unit is configured to generate a portion of a second product in the first position when the dispensing unit is generating the second portion of the product in the second position.

11 Claims, 6 Drawing Sheets

(51) Int. Cl.
*B67D 1/00* (2006.01)
*A47J 31/44* (2006.01)
*G06F 3/0482* (2013.01)
*G06F 3/0484* (2013.01)

(58) Field of Classification Search
USPC .............................. 141/9, 100, 103–104, 168
See application file for complete search history.

(56) References Cited

U.S. PATENT DOCUMENTS

| | | | | |
|---|---|---|---|---|
| 3,822,729 | A * | 7/1974 | Rochette | A47B 69/00 134/115 R |
| 4,098,058 | A * | 7/1978 | Carrigan | B65B 7/2807 141/238 |
| 4,590,975 | A * | 5/1986 | Credle, Jr. | B67D 1/08 141/1 |
| 4,628,974 | A * | 12/1986 | Meyer | B67D 1/0021 141/103 |
| 4,944,337 | A | 7/1990 | Credle, Jr. et al. | |
| 4,951,719 | A * | 8/1990 | Wiley | B67D 1/0041 141/1 |
| 4,961,447 | A * | 10/1990 | Credle, Jr. | B67D 1/0021 141/1 |
| 4,967,808 | A * | 11/1990 | Credle, Jr. | B67D 1/0021 141/103 |
| 4,971,120 | A * | 11/1990 | Credle, Jr. | B67D 1/0021 141/1 |
| 5,027,869 | A * | 7/1991 | Tsumura | B65B 43/56 141/104 |
| 5,058,630 | A | 10/1991 | Wiley et al. | |
| 5,074,341 | A * | 12/1991 | Credle, Jr. | B67D 1/0021 141/1 |
| 6,053,359 | A | 4/2000 | Goulet et al. | |
| 6,102,246 | A * | 8/2000 | Goulet | B67D 1/00 221/11 |
| 6,607,013 | B1 | 8/2003 | Leoni | |
| 7,577,498 | B2 | 8/2009 | Jennings et al. | |
| 7,896,038 | B2 * | 3/2011 | Jones | A23G 9/22 141/103 |
| 9,141,562 | B2 * | 9/2015 | Pickett | G07F 13/10 |
| 9,227,830 | B2 * | 1/2016 | Angus | B67D 7/302 |
| 2006/0037969 | A1 * | 2/2006 | Jennings | B25J 9/0084 222/129.1 |
| 2006/0043111 | A1 * | 3/2006 | Jennings | B25J 9/0084 222/129.1 |
| 2007/0106422 | A1 * | 5/2007 | Jennings | B25J 9/0084 700/245 |
| 2007/0131715 | A1 | 6/2007 | Minard et al. | |
| 2009/0186141 | A1 | 7/2009 | Almblad et al. | |
| 2010/0242497 | A1 | 9/2010 | Bertone | |
| 2011/0088560 | A1 | 4/2011 | Nosler et al. | |
| 2013/0220480 | A1 * | 8/2013 | Angus | B67D 7/302 141/9 |
| 2014/0041748 | A1 * | 2/2014 | Angus | B67D 1/0041 141/1 |
| 2016/0083123 | A1 * | 3/2016 | Angus | B67D 7/302 53/411 |

FOREIGN PATENT DOCUMENTS

| | | |
|---|---|---|
| EP | 1690481 A2 | 8/2006 |
| FR | 2624844 A1 | 6/1989 |
| GB | 2414015 A | 11/2005 |
| WO | 8504157 A1 | 9/1985 |
| WO | 0058200 A1 | 10/2000 |
| WO | 2007077211 A1 | 7/2007 |
| WO | 2011011690 A1 | 1/2011 |

OTHER PUBLICATIONS

Written Opinion for application PCT/US2013/039177 mailed Jul. 29, 2013, 6 pages.

YouTube clip posted by cocktailsforyou, "Cocktail Machine—Dispenser—Mixer", screen shot, http://www.youtube.com/watch?v=cNVYVEM8uAc&feature=related, 2 pages.

YouTube clip posted by Jonathan Taylor, "Automated Mixed-Drink Dispenser", screen-shot, http://www.youtube.com/watch?v=6TiK8krJ0II, 2 pages.

* cited by examiner

MULTI-POSITION BEVERAGE DISPENSER

BACKGROUND

Users and consumers of products are constantly seeking ways to customize or tailor a product to their desires or needs. In the context of beverages, rarely will two users or consumers prefer to have a drink made in the same exact way. For example, a first user may prefer her beverage to be sweeter than a beverage of a second user. Personal tastes, medical conditions, or any other number of factors may influence or dictate how a beverage should be made for a particular user.

In the context of a commercial or production environment, producers are frequently seeking out ways to improve the marketability of their products and the efficiency by which they are able to generate or output their products. For example, a restaurant or ice cream parlor may realize an increase in the number of patrons on a given day, such as on a weekend or holiday. In order to maximize profits, the establishment will want to provide service, such as beverage service, as quickly as possible. The difference between slow and fast beverage service could be the difference between the establishment being able to stay open or being forced to close due to market pressures (e.g., insufficient income or revenue).

BRIEF SUMMARY

An embodiment includes an apparatus comprising: a control unit comprising an input/output interface to receive a selection of a product, a dispensing unit in communication with the control unit, the dispensing unit receiving commands from the control unit, the dispensing unit configured to generate a first portion of the product in a first position and generate a second portion of the product in a second position, and a shifting mechanism coupled to the dispensing unit, the shifting mechanism moving a product containing device from the first position to the second position when the first portion of the product is complete, wherein the dispensing unit is configured to generate a portion of a second product in the first position when the dispensing unit is generating the second portion of the product in the second position.

An embodiment includes an apparatus comprising a control unit comprising an input/output interface to receive a selection of a product, a dispensing unit in communication with the control unit, the dispensing unit receiving commands from the control unit, the dispensing unit configured to generate a first portion of the product in a first position and generate a second portion of the product in a second position, and a shifting mechanism coupled to the dispensing unit, the shifting mechanism moving a product containing device from the first position to the second position when the first portion of the product is complete and shifting the product containing device from the second position to the first position when the second portion is complete.

An embodiment includes a method comprising configuring an apparatus to receive a beverage selection, configuring the apparatus to generate a beverage corresponding to the beverage selection in a plurality of positions, configuring the apparatus to shift a beverage containing device from a first position to a second position responsive to a first portion of the beverage generation having been completed in the first position, configuring the apparatus to complete a second portion of the beverage generation in the second position, and configuring the apparatus to generate at least a portion of a second beverage in a second beverage containing device located in the first position when the second portion of the beverage generation occurs in the second position.

An embodiment includes a method comprising configuring an apparatus to receive a beverage selection, configuring the apparatus to generate a beverage corresponding to the beverage selection in a plurality of positions, configuring the apparatus to shift a beverage containing device from a first position to a second position responsive to a first portion of the beverage generation having been completed in the first position, and configuring the apparatus to shift the beverage containing device from the second position to the first position responsive to a second portion of the beverage generation having been completed in the second position.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

In accordance with various embodiments, apparatuses, systems and methods are described for generating or outputting a product, such as a beverage. While largely stated in terms of beverages, the techniques and methodologies described herein may be adapted to accommodate other forms of product or liquid generation, production, or dispensation.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect.

Figure 1A:
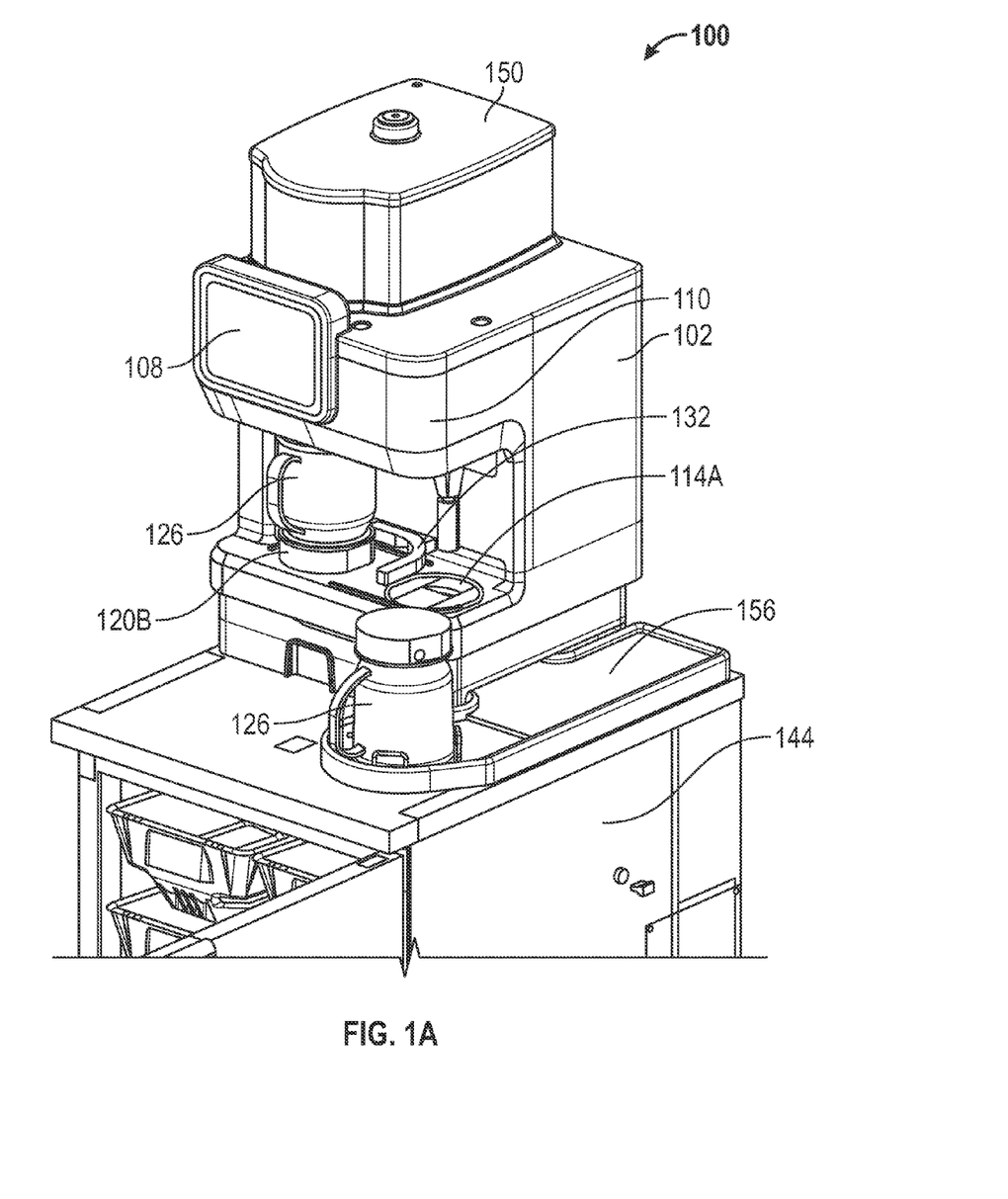
FIGS. 1A-1B illustrate exemplary apparatuses for preparing beverages.

FIG. 1A illustrates an apparatus 100 in accordance with one or more exemplary embodiments. Apparatus 100 may be used to produce one or more products, such as one or more beverages. In some embodiments, apparatus 100 may include a dispensing unit 102. Dispensing unit 102 may be configured to produce, generate, and/or output one or more substances, such as a liquid flavorings, ice, yogurt, etc. Dispensing unit 102 may include nozzles, valves, tubing, piping, and the like (not shown) to facilitate the production, generation, and/or output of liquid. In some embodiments, the liquid that may be output may be associated with one or more beverages, such as water, soda, juice, milk, coffee, tea, etc.

In some embodiments, apparatus 100 may include a control unit 108. While control unit 108 is shown in FIG. 1A as being integrated with dispensing unit 102, in some embodiments control unit 108 may be separate from, or merely coupled to, dispensing unit 102. For example, in some embodiments control unit 108 may be configured to wirelessly receive and/or transmit data or information from/to dispensing unit 102, or another entity.

Control unit 108 may be configured to receive one or more selections regarding one or more products. For example, control unit 108 may be configured to receive a selection that identifies a beverage via an input/output (I/O) interface, such as a touchscreen display, a pushbutton, a keyboard, a voice control/command interface, etc. In response to the selection, the control unit 108 may issue one or more directives, instructions, or commands to the dispensing unit 102 (or a portion thereof) to produce or output a beverage that corresponds to the identified beverage.

In some embodiments, the dispensing unit 102 and/or control unit 108 may store data corresponding to a recipe or formula for producing a beverage. For example, to produce a fruit beverage, the stored data may identify ingredients, such as fruit, syrup, yogurt, whipped cream, ice, and the like.

The stored data may identify a particular brand to use in connection with one or more of the ingredients. Branding may allow for tiered-beverage production, wherein ingredients associated with reputable manufacturers may result in a higher cost to a consumer of the beverage relative to ingredients sourced from manufacturers of lower quality or reputation.

The stored data may identify an amount, quantity, or volume for each type of ingredient. Such data may be used in connection with various sizes of beverage, such as small, medium, and large, for example. In this manner, an appropriate amount, quantity, or volume for each ingredient may be applied based on the size of beverage selected by the user or consumer.

The stored data may include a production method or process to follow for producing the beverage. Continuing the above example of producing a fruit beverage, the method/process may include one or more of the following steps: (1) dispense fruit, (2) dispense syrup, (3) dispense yogurt, (4) dispense ice, (5) blend and (6) dispense whipped cream. The order of the steps may be different in some embodiments, and may be a function of one or more user selections. In some embodiments, additional steps may be used and some of the steps may be optional.

In some embodiments, one or more of the steps may be automatically performed without user input. For example, the dispensation of the syrup (step 2) may be performed automatically by dispensing unit 102. In some embodiments, one or more of the steps may be performed via manual intervention or action. For example, the control unit 108 may display an instruction to the user to insert/dispense fruit (step 1). In some embodiments, an opening, such as a chute, a hole or a door 110 located above a first position may be used to facilitate manual insertion or dispensation of the fruit (or any other ingredient).

In some embodiments, based on a selection of a beverage to produce, as well as data stored in one or more of dispensing unit 102 and/or control unit 108 as described above, dispensing unit 102 may generate or output the selected beverage.

In some embodiments, the beverage may be generated or produced in connection with one or more states, positions, or stages. For example, as shown in FIG. 1, dispensing unit 102 may include a first position (position "A" 114) and a second position (position "B" 120). In some embodiments, more or less than two positions may be used. In the embodiment shown in FIG. 1A, dispensing unit 102 may be configured to produce a first portion of a beverage in position 114, and the remaining portion(s) of the beverage in position 120, such that a complete beverage may be available in a containing device, such as a blending/mixing vessel or a pitcher 126, following completion of the portion(s) in position 120.

In some embodiments, control unit 108 may cause a message to be generated that may indicate that the beverage is complete or ready for consumption. That message may take any form, such as a visual display message, an audio message (e.g., a beeping sound), etc. The time that pitcher 126 should spend in a given position during the production/generation of the beverage may correspond to a parameter that may be stored in dispensing unit 102 and/or control unit 108.

In some embodiments, dispensing unit 102 may include a shifting mechanism 132 to facilitate production of a beverage in more than one position. In some embodiments, shifting mechanism 132 may include a yoke. The yoke may be configured as a single bar that may be used to push or slide, e.g., a pitcher 126 from position 114 to position 120. In some embodiments, the pitcher 126 (or any other containing device) may be translated using a turn table or the like. For example, in some embodiments the turn table may be rotated or spun about a mandrel. One or more containing devices (e.g., cups, pitchers, etc.) may be located along or near the perimeter of the turn table. Such an arrangement may be analogous to placing the containing device(s) at the point where a spoke meets the edge or perimeter of a wheel. In some embodiments, the shifting, pushing, or sliding may occur automatically.

Figure 1B:
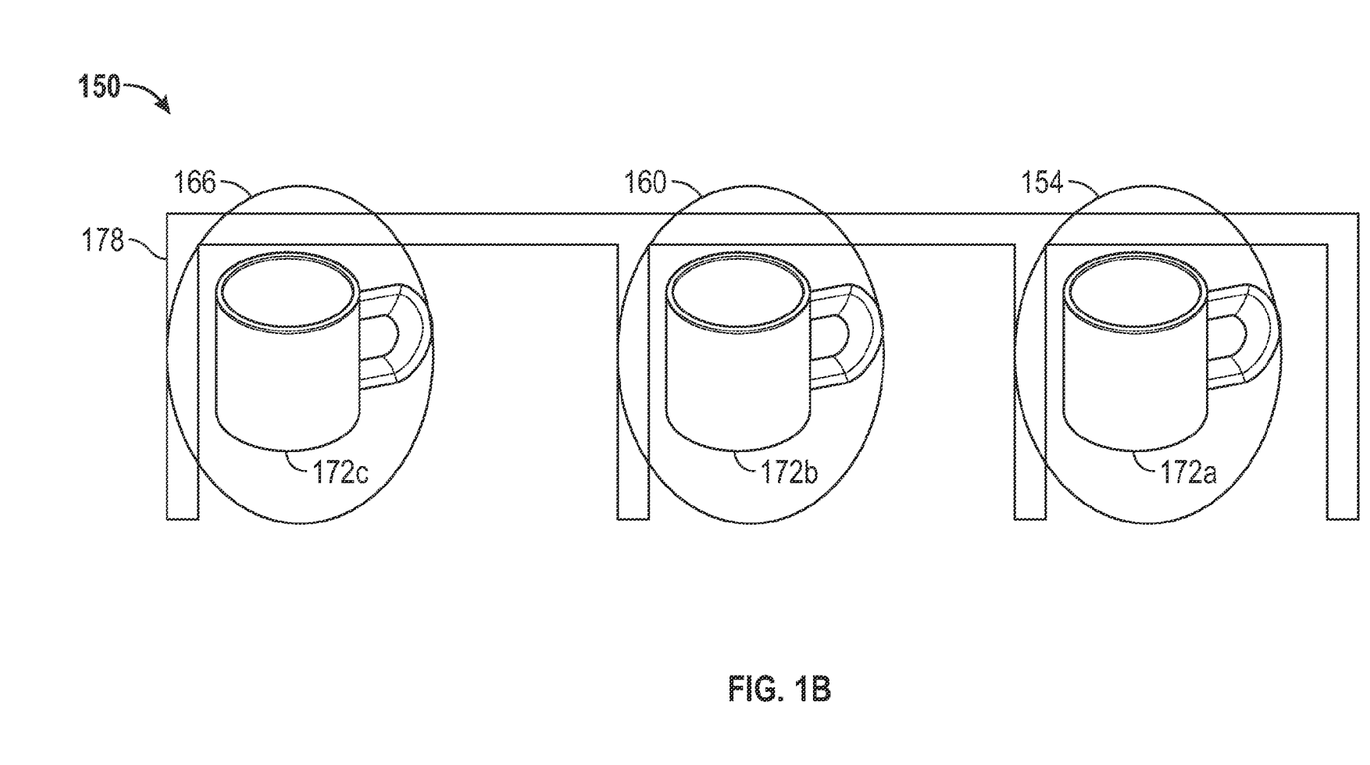

In some embodiments, multiple beverages may be in process at a given moment in time. For example, a first portion of a first beverage may be produced in a first pitcher 126 in position 114. Once the first portion of the first beverage is complete, the first pitcher 126 may be shifted from position 114 to position 120 by shifting mechanism 132 to complete a second or remaining portion. At that same moment (or slightly thereafter), the generation of a second beverage may be initiated by returning shifting mechanism to first position 114 and placing a second pitcher 126 in position 114. The efficiency of beverage production can be enhanced or improved, as the generation of a second beverage may begin prior to completing the generation of a first beverage. The efficiency may be further improved by using more than two positions. In FIG. 1B, an apparatus 150 is shown. The apparatus 150 may be analogous to, or correspond to, (a portion of) the apparatus 100 of FIG. 1A. As shown, the apparatus 150 may include, e.g., three positions, labeled 154, 160, and 166. In some embodiments, the position 154 may correspond to a first position, the position 160 may correspond to a second position, and the position 166 may correspond to a third position. Three containing devices (e.g., three cups) 172a-172c are also shown. A shifting mechanism 178, which may be analogous to the shifting mechanism 132 of FIG. 1A, may be used to shift or translate one or more of the containing devices 172a-172c between the positions 154, 160, and 166. In the example shown in FIG. 1B, three orders may be in progress at the same time, at various stages of production.

In some embodiments, a pitcher 126 may populate a given position more than once during a given beverage production cycle. For example, in some embodiments a beverage may be produced by first placing pitcher 126 in position 114, then shifting the pitcher 126 from position 114 to position 120, followed by a shift of pitcher 126 from position 120 back to position 114. In this regard, shifting mechanism 132 (e.g., a yoke) may be U-shaped (or include a U-shaped member) to facilitate shifting a pitcher 126 back-and-forth between position 114 and position 120.

Other configurations for the positions and/or shifting mechanism may be used in some embodiments. For example, while positions 114 and 120 may be arranged in one-dimension as shown in FIG. 1A, in some embodiments dispensing unit 102 may include positions arranged in two or three dimensions. Accordingly, the shifting mechanism 132 (e.g., a shape of shifting mechanism 132 and/or its drive unit) may be adapted to accommodate various configurations or locations of the positions along a plurality of axes.

In some embodiments, apparatus 100 may include a cabinet 144. While shown as a single cabinet in FIG. 1A, cabinet 144 may include more than one cabinet in some embodiments.

In some embodiments, cabinet 144 may include a transportation mechanism, such as wheels, in order to facilitate moving apparatus 100. For example, apparatus 100 may be moved from a first work station to a second work station in some embodiments. Such mobility may be used to reduce station downtime by allowing a second apparatus 100 to be substituted for a first apparatus 100 in the event the first apparatus 100 fails.

Figure 2:
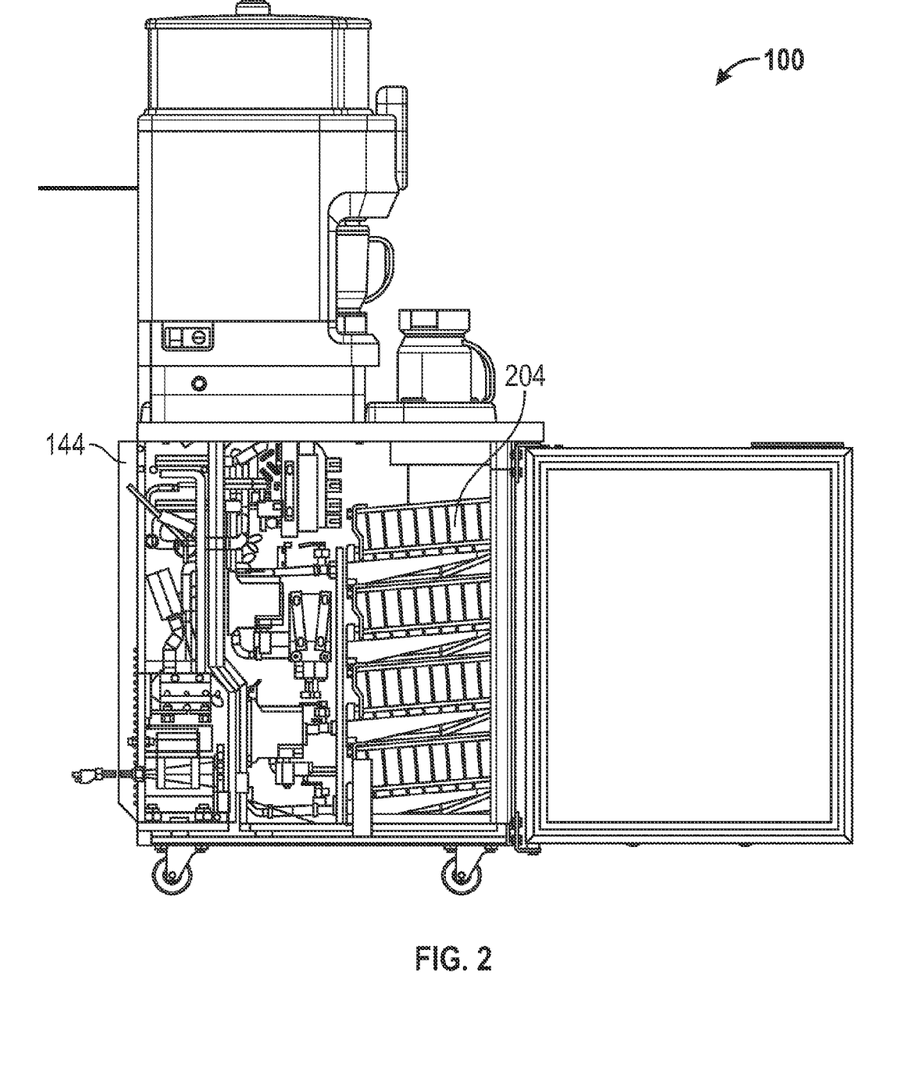
FIG. 2 is a partial cross-sectional view of the apparatus.

As shown in FIG. 2, cabinet 144 may include one or more bins 204. In the example of FIG. 2, cabinet 144 includes eight bins 204 (four bins 204 are visible in FIG. 2, and the remaining four bins 204 may be on the other side of cabinet 144). Bins 204 may be configured to store one or more items, such as one or more ingredients. A given bin 204 may store a particular ingredient (e.g., a particular flavor syrup or brand of whipped cream). Pumps in cabinet 144 are used to deliver product from bins 204 to dispensing unit 102.

Cabinet 144 may be at least partially refrigerated or completely refrigerated. For example, one or more bins 204 may be refrigerated in order to ensure that ingredients that need to remain cold (e.g., ingredients that are intended to be refrigerated) do so.

Referring back to FIG. 1A, apparatus 100 may include a compartment 150. Compartment 150 may be configured to store one or more ingredients. For example, compartment 150 may be configured to store ice, liquid water, etc. In some embodiments, compartment 150 and/or dispensing unit 102 may include a separate hook-up or connection (not shown) to a water source for purposes of receiving water and/or generating ice. In some embodiments, compartment 150 may include doors, a lid, or a like that would allow a user to manually insert or pour liquid water or ice into compartment 150.

As shown in FIG. 1A, apparatus 100 may include a rinse and staging area 156. Rinse and staging area 156 may be used to clean one or more pitchers 126. For example, rinse and staging area 156 may be configured to receive a pitcher and supply soap and/or water to the pitcher 126. Rinse and staging area 156 may further include drying equipment (not shown) to facilitate drying a wet pitcher 126 following use or cleaning.

Figure 3:
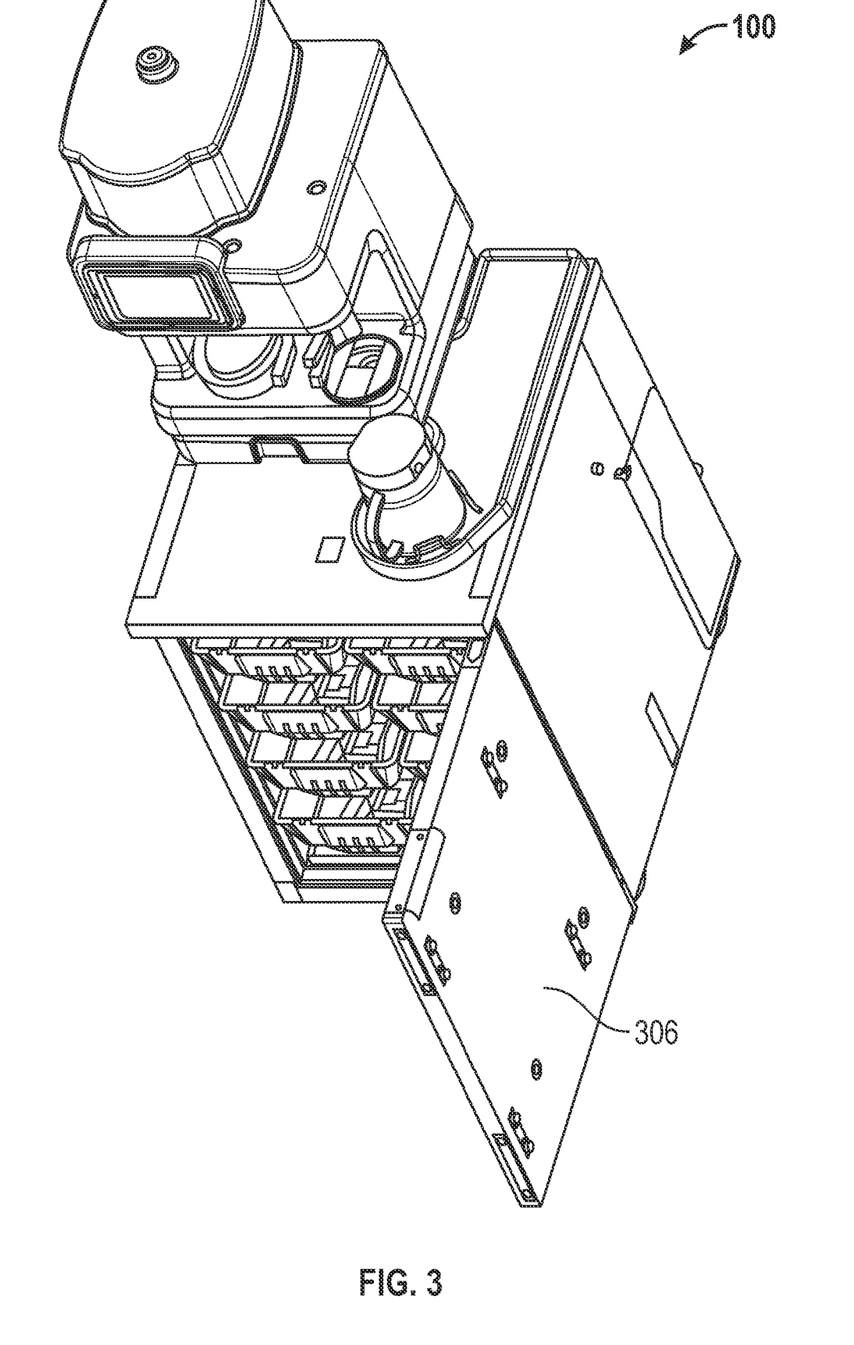
FIG. 3 is a perspective view of the apparatus.

As shown in FIG. 3, cabinet 144 may include a door 306. While a single door 306 is shown in connection with a cabinet 144, more than one door may be used in some embodiments. Door 306 may serve to conceal one or more components or devices within cabinet 144, and may protect those components or devices from damage (e.g., a spillage of liquid). Door 306 may also provide security to one or more ingredients that may be stored in cabinet 144 (e.g., in bins 204). For example, door 306 may include a lock (or other mechanism) to prevent a theft of ingredients or tampering with components or devices included in cabinet 144.

Figure 4:
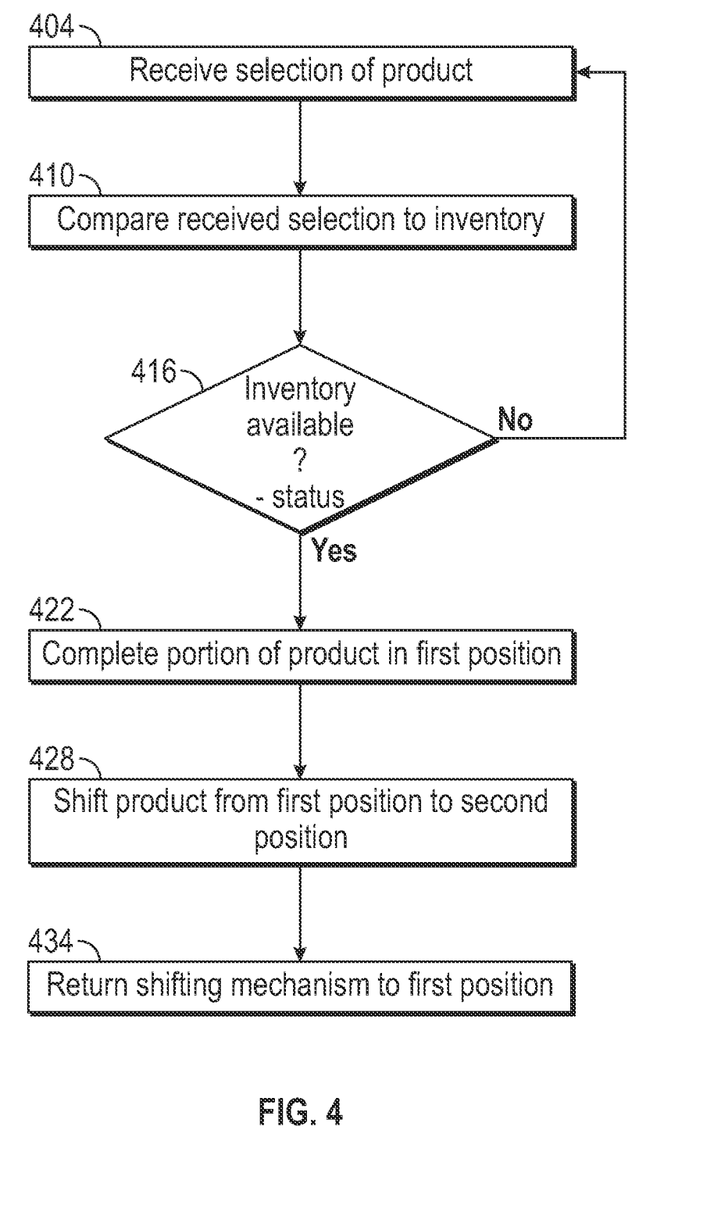
FIGS. 4-5 illustrate exemplary methods.

FIG. 4 illustrates a method in accordance with one or more aspects of this disclosure. The method of FIG. 4 may be used to generate or output a product, such as a beverage. The method of FIG. 4 is described below in connection with the components and devices illustrated in FIGS. 1-3 described above. The method of FIG. 4 may be adapted to accommodate components or devices different from those described above.

In step 404, a selection of a product may be received. For example, a patron of an establishment (e.g., an ice cream parlor, a fast food restaurant, etc.) may place an order for a beverage at a point of sale, such as a register (not shown). The register may communicate the order to dispensing unit 102 and/or control unit 108. In some embodiments, a person affiliated with the establishment (e.g., an employee of the establishment) may place the order directly into dispensing unit 102 and/or control unit 108. In some embodiments, the patron may place the order via a user interface. For example, a touch pad, a screen, or any other input mechanism may be located at the point of sale, at one or more tables or booths in the establishment, etc. The patron's order may be communicated from the input mechanism to one or more of the register, dispensing unit 102, and control unit 108.

In step 410, dispensing unit 102 and/or control unit 108 may compare the received selection or order to an inventory of ingredients. For example, if the patron ordered a large fruit beverage, in step 410 a list of the ingredients (e.g., fruit, syrup, yogurt, whipped cream, ice), and the quantity or volume of each ingredient, for producing a large fruit beverage may be obtained from, e.g., a memory associated with the dispensing unit 102 and/or control unit 108. As part of step 410, dispensing unit 102 and/or control unit 108 may compare the obtained list of ingredients to the quantity or volume of corresponding ingredients available at apparatus 100.

In some embodiments, the process for making the beverage may also be evaluated. As part of step 410, a determination may be made that the appropriate equipment to support preparing or generating the beverage is currently available. For example, if the patron ordered a fruit beverage, a determination may be made in step 410 that a pitcher 126 is available, that apparatus 100 is configured for blending, etc.

A status of the comparison of step 410 may be generated in connection with step 416. For example, the status may simply indicate that the ordered beverage cannot be produced if, e.g., one or more ingredients are either not available or not available in the appropriate amounts or quantities, and flow may proceed from step 416 to step 404 (along the "No" path as shown in FIG. 4) to request or receive another order (e.g., the patron may order a different beverage as a result of the lack of one or more ingredients associated with the patron's first order). In some embodiments, the status may provide an indication of the deficiency in more specific terms. For example, a message may be displayed on control unit 108, advising an employee that there is a deficiency or short-fall in yogurt to produce a fruit beverage. In some embodiments, the message provided via control unit 108 may be even more specific, such as "machine is currently short 6 oz. of yogurt to produce a large fruit beverage."

In some embodiments, the patron may be given the option to proceed with an order, despite the deficiency. In some embodiments, a patron may receive a discount on the order, or may receive a coupon or discount for a beverage ordered on a future date.

In some embodiments, when there is a deficiency or short-fall, a determination may be made whether, e.g., the missing ingredient(s) is/are available at another location (e.g., in a storage locker). If the missing ingredient(s) is/are available at another location, the control unit 108 may provide an employee with a message that identifies that the ingredient(s) is/are available, a location of the ingredient(s) (e.g., a particular storage locker), and that the employee should acquire the missing ingredient(s).

In some embodiments, in order to minimize downtime or unavailability of a particular beverage, apparatus 100 may provide a warning or indication to an employee that, e.g., an ingredient has fallen below a threshold amount. In some embodiments, the threshold may be a fixed value (e.g., 10% of a capacity of compartment 150) for a particular ingredient. In some embodiments, the threshold may fluctuate based on sales trends, seasonal fluctuations, etc. For example, in summer months patrons may have a greater tendency to order cold drinks (e.g., fruit beverages) relative to warm or hot drinks (e.g., coffee). In this regard, during the summer months the threshold on ice may be set higher (e.g., at 20% of capacity of compartment 150) relative to the threshold used for ice during winter months (e.g., at 5% of capacity of compartment 150). The threshold may be set based on any number or type of input parameter or condition.

Referring back to FIG. 4, assuming that the ingredient(s) needed for an ordered beverage are available (or assuming that the beverage is to be produced despite any noted deficiencies, such as a deficiency in one or more ingredients), flow may proceed along the "Yes" path from step 416 to step 422. In step 422, a portion of the order may be completed in a first position (e.g., position 114). For example, if the order includes a fruit beverage, fruit may be inserted or dispensed into a pitcher 126 (optionally by way of door 110), and syrup may be (automatically) inserted into the pitcher 126 via dispensing unit 102.

As part of step 422, a determination may be made that a containing device (e.g., a pitcher) is located or placed in position 114. Detecting that a containing device is present may help to avoid dispensing ingredients when no receptacle is present to receive the ingredients. The determination may be made based on the weight of a containing device, a scanning of a bar code located on the bottom of the containing device, or via any other technique.

Once the steps associated with position 114 for producing the ordered beverage are complete, pitcher 126 may be shifted from position 114 to another position (e.g., position 120) in connection with the flow from step 422 to step 428. The flow from step 422 to step 428 may be based on a predetermined timeout. For example, once an order is placed, an employee may be given thirty seconds to position a pitcher 126 in position 114 before pitcher 126 is automatically shifted to position 120. In some embodiments, and particularly those embodiments where a manual step is involved (e.g., a manual insertion of fruit by way of door 110), the employee may provide an indication to apparatus 100 that the steps associated with position 114 have been completed so as to preclude a premature shifting of the pitcher 126 from position 114 to position 120.

As part of step 428, a second portion of the beverage production steps may be completed. For example, in connection with an order for a fruit beverage, in step 428 dispensing unit 102 may shift the pitcher to location 12 and (1) dispense yogurt into pitcher 126, (2) dispense ice, (3) cause the contents of pitcher 126 to be blended (e.g., a blending of fruit, syrup, yogurt, and ice), and (4) dispense whipped cream.

As part of step 428, while the first order (e.g., the fruit beverage order) is being completed in position 120, the production of a beverage for a second order (e.g., an order for a cookie crumble beverage) may take place in position 114. In this regard, the positions (e.g., positions 114 and 120) of the apparatus may be used to enhance or improve the efficiency of the beverage production process by enabling multiple beverages to be produced at the same time. In other words, production associated with a second order can be initiated prior to completion of production associated with a first order.

Once the first order is complete, apparatus 100 may provide an indication or message that the first order is complete. Such an indication or message may allow a user (e.g., an employee or patron) to know when it is appropriate to remove pitcher 126 from apparatus 100. Once the contents of pitcher 126 have been provided to another receptacle (e.g., a glass, a cup, a thermos, a bowl, etc.) for consumption, the pitcher 126 may be placed into rinse and staging area 156 for cleaning purposes. In some embodiments, pitcher 126 may be reused without being subjected to a rinse or cleaning. For example, if another order is received for the same beverage, pitcher 126 may be placed back into position 114 without being subjected to a rinse or cleaning. In some embodiments, health codes (e.g., local health codes) may dictate rinsing or cleaning pitcher 126 following each use.

In step 434, shifting mechanism 132 may be moved from position 120 to position 114 to accommodate producing the beverage associated with the second order. For example, shifting mechanism 132 may be moved from position 120 to position 114 following initiation of production of the second portion of the beverage associated with the first order at position 120 to accommodate moving a pitcher 126 associated with the second order from position 114 to position 120.

Figure 5:
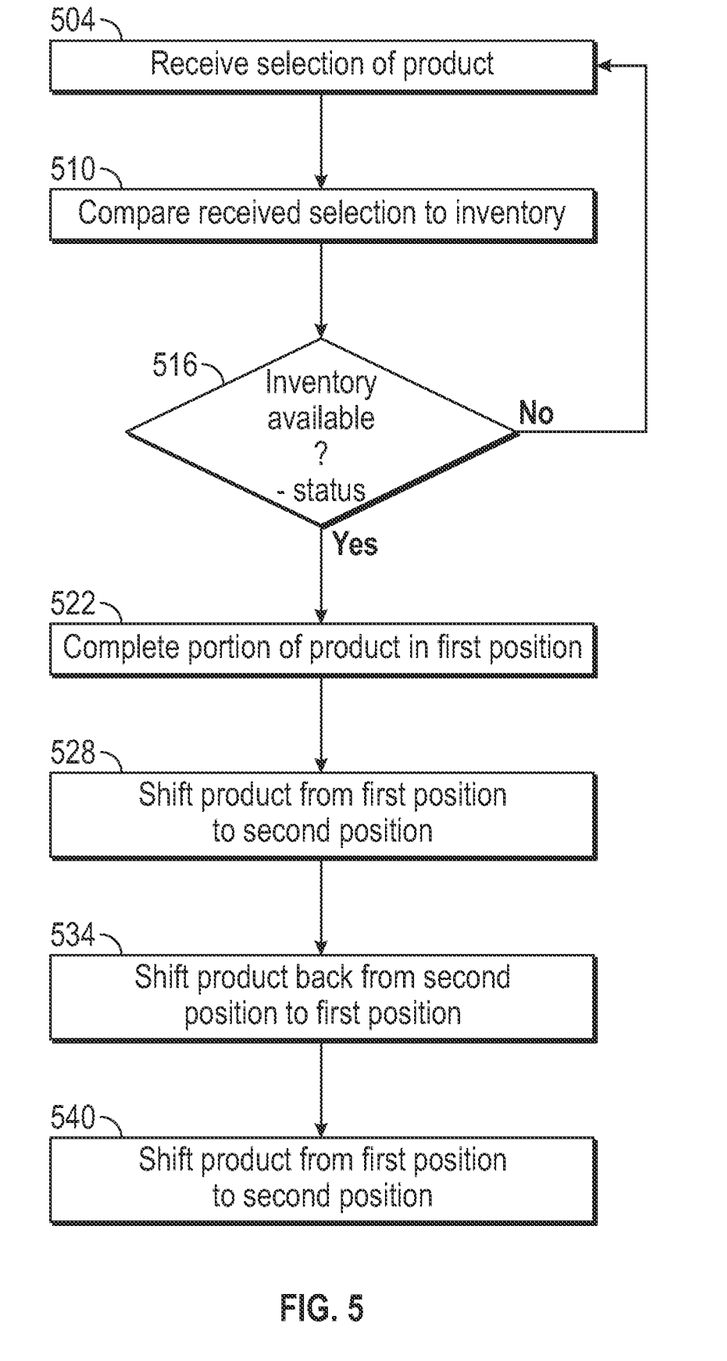

FIG. 5 illustrates an alternate method in accordance with one or more embodiments. The method of FIG. 5 may be used to generate or output a product, such as a beverage. The method of FIG. 5 is described below in connection with the components and devices illustrated in FIGS. 1-3 described above. The method of FIG. 5 may be adapted to accommodate components or devices different from those described above.

Steps 504-528 may be analogous to their counterpart steps 404-428 associated with FIG. 4. As such, a complete (re) description of steps 504-528 is omitted for the sake of brevity. The method of FIG. 5 is different from the method of FIG. 4 in connection with steps 534 and 540. In step 534 (unlike in step 434), the production of the (first) order is not complete when a pitcher 126 first appears in the second position 120. Instead, in step 534, the pitcher 126 associated with the first order is shifted from the second position 120 back to the first position 114. Step 534 may be used, for example, to add additional ingredients, such as fresh fruit, probiotics, etc., to pitcher 126 following a blending conducted in connection with step 528.

In some embodiments, the method of FIG. 5 may end at step 534 with the pitcher 126 in the first position 114 (e.g., with the fresh chunks of fruit having been added to the pitcher 126). Alternatively, the pitcher 126 may be again shifted back to the second position 120, from the first position 114, to complete the beverage production associated with the (first) order in step 540. In one example, the beverage is blended a second time at position 120, although the second blending may occur for a reduced amount of time to maintain integrity of ingredients, e.g., fruit. In another example, in step 540, sprinkles may be added to the pitcher 126, and the beverage order may be complete following this addition. In some embodiments, the beverage production cycle may always end in the second position 120, even if there were no additional ingredients to add in step 540 (e.g., even if sprinkles were not called for by the recipe for a fruit beverage). Moreover, the shifting of the pitcher 126 from the first position 114 to the second position 120 (steps 528 and 540) or from the second position 120 to the first position 114 may repeat any number of times as dictated by, e.g., the beverage production process, the tool sets used, the number of steps or ingredients involved, etc.

As described, embodiments are directed to a production and generation of beverages. In particular, embodiments provide for a greater degree of complexity, sophistication, customization, and tailoring of beverages to meet a particular user's (e.g., patron's) needs or preferences. In some embodiments a user may be provided an option to customize a beverage recipe or production method. For example, in the context of producing a fruit beverage, a user may be provided an option to add or remove one or more ingredients, optionally at cost to the user. Similarly, the user may be provided an option to select how thick or smooth to make the fruit beverage, whether an ingredient should be included after blending (e.g., whether the user wants diced fruit added after the blending has taken place), etc.

Embodiments may provide for greater efficiency in terms of beverage production. As described, a beverage may be produced in various stages or positions, wherein a portion of the overall production cycle may be completed in each stage or position. In this manner, throughput (e.g., the number of beverages produced per unit time) may increase relative to prior techniques, as multiple beverages may be in production at any given point in time.

In some embodiments, a sequence with which beverage orders are handled may be different from the sequence which those same orders are received. For example, if in terms of time: (1) a first received order is for a first fruit beverage, (2) a second received order is for a cookie crumble beverage, and (3) a third received order is for a second fruit beverage, the order of production may be adjusted (e.g., by apparatus 100) such that: (1) the first received order is processed first, (2) the third received order is processed next, and (3) finally the second received is processed. In other words, the fruit beverage orders may be processed in sequence, followed by the cookie crumble beverage order, despite the fact that the cookie crumble beverage order represented an intervening order. Such a rearrangement in terms of the processing order may help to minimize: a waste of ingredients (e.g., a discarding of ingredients), cleaning or rinsing cycles via reuse, etc.

In some embodiments, efficiency in production (e.g., reordering the sequence of production) may be balanced or traded-off relative to timely production of a particular user's order. For example, apparatus 100 may be configured to allow a particular customer to wait for a beverage if it means that a greater number of beverages can be produced by apparatus 100, but that customer's wait may be capped at some threshold amount (which may be expressed as a measure of time, as a function of the number of orders that were placed after the customer's order was received, etc.) so as to avoid annoying the customer.

Embodiments have been described in terms of the generation, production, and output of products, such as beverages. One skilled in the art will appreciate that embodiments may be adapted to accommodate different types of products. For example, the techniques described herein may be applied in agricultural use (e.g., fertilizer or pesticide production), fuel production (e.g., gasoline produced by a refinement of petroleum or oil), etc. Additional applications are within the scope and spirit of the disclosure.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Embodiments may be tied to particular machines. For example, as described herein, dispensing unit 102, control unit 108, and/or cabinet 144 may work in concert to generate a product in various stages. Furthermore, embodiments may transform an article into a different state or thing. For example, inputs (e.g., ingredients) may be combined by subjecting the inputs to various production processes (e.g., blending, crushing, grinding, heating/cooling), potentially at various stages or positions, and an output product (e.g., a beverage) may be generated.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. An apparatus comprising:
   a control unit comprising an input/output interface to receive a selection of a product;
   a dispensing unit in communication with the control unit, the dispensing unit receiving commands from the control unit, the dispensing unit configured to generate a first portion of the product in a first position and generate a second portion of the product in a second position; and
   a shifting mechanism coupled to the dispensing unit, the shifting mechanism moving a product containing device from the first position to the second position when the first portion of the product is complete;
   wherein the control unit is configured to receive a selection of a second product after the selection of the product, and wherein the second product is different from the product, and wherein the control unit is configured to receive a selection of a third product after the selection of the second product and wherein the third product is substantially similar to the product, and wherein the control unit is configured to command the dispensing unit to generate the product, followed by the third product, followed by the second product.

2. The apparatus of claim 1, wherein the product comprises a beverage, and wherein the product containing device comprises a blending/mixing vessel.

3. The apparatus of claim 1, wherein:
   the shifting mechanism is a yoke for contacting the product containing device;

wherein the dispensing unit is configured to programmatically shift the product containing device from the first position to the second position using the yoke.

4. The apparatus of claim 1, further comprising:
an opening configured to allow for a manual insertion of an ingredient to the product containing device while the product containing device is positioned in at least one of the first position and the second position.

5. The apparatus of claim 1, wherein the control unit is configured to determine that the apparatus has at least one of: a sufficient number of ingredients to generate the product and equipment to generate the product, and wherein the dispensing unit is configured to generate the first portion of the product responsive to said determination.

6. The apparatus of claim 1, further comprising:
a cabinet configured to store a plurality of ingredients associated with the product; and
wherein at least a portion of the cabinet is refrigerated.

7. An apparatus comprising:
a control unit comprising an input/output interface to receive a selection of a product;
a dispensing unit in communication with the control unit, the dispensing unit receiving commands from the control unit, the dispensing unit configured to generate a first portion of the product in a first position and generate a second portion of the product in a second position; and
a shifting mechanism coupled to the dispensing unit, the shifting mechanism moving a product containing device from the first position to the second position when the first portion of the product is complete and shifting the product containing device from the second position to the first position when the second portion is complete.

8. The apparatus of claim 7, wherein the dispensing unit is configured to generate a third portion of the product in the first position, and wherein the shifting mechanism is configured to shift the product containing device from the first position to the second position when the third portion is complete.

9. The apparatus of claim 7, wherein the received selection comprises a user specification of how the product is generated.

10. The apparatus of claim 7, wherein the control unit is remotely located from the dispensing unit.

11. An apparatus comprising:
a control unit comprising an input/output interface to receive a selection of a product;
a dispensing unit in communication with the control unit, the dispensing unit receiving commands from the control unit, the dispensing unit configured to generate a first portion of the product in a first position;
the dispensing unit configured to blend the product in a second position; and
a shifting mechanism coupled to the dispensing unit, the shifting mechanism configured to (i) move a product containing device from the first position to the second position when the first portion of the product is complete, (ii) shift the product containing device from the second position to the first position after the product is blended at the second position, and (iii) shift the product containing device from the first position to the second position after a second portion of the product is added at the first position.

* * * * *